(12) United States Patent
Mutoh et al.

(10) Patent No.: US 8,758,872 B2
(45) Date of Patent: Jun. 24, 2014

(54) EDGE PROTECTOR

(75) Inventors: Tadashi Mutoh, Kanagawa (JP);
Satoshi Takayanagi, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 145 days.

(21) Appl. No.: 13/372,176

(22) Filed: Feb. 13, 2012

(65) Prior Publication Data

US 2012/0207979 A1    Aug. 16, 2012

(30) Foreign Application Priority Data

Feb. 14, 2011 (JP) .................................. 2011-28265

(51) Int. Cl.
*B60J 10/04* (2006.01)

(52) U.S. Cl.
USPC ............................................ 428/57; 428/122

(58) Field of Classification Search
USPC ............ 428/122, 99, 57, 31; 49/490.1, 475.1; 293/128
See application file for complete search history.

(56) References Cited

U.S. PATENT DOCUMENTS 7,785,686 B2 *    8/2010  Fukui et al. ..................... 428/57
2008/0095957 A1    4/2008  Fukui et al.

FOREIGN PATENT DOCUMENTS

| CN | 1500668 A | 6/2004 |
|---|---|---|
| CN | 1666898 A | 9/2005 |
| CN | 200961431 Y | 10/2007 |
| EP | 1 652 710 A2 | 5/2006 |
| EP | 1 652 710 A2 | 11/2007 |
| JP | 3525692 B2 | 5/2004 |
| JP | 2005-104168 | 4/2005 |
| JP | 4222135 B2 | 2/2009 |

* cited by examiner

*Primary Examiner* — Alexander Thomas
(74) *Attorney, Agent, or Firm* — Cheng Law Group, PLLC (57) ABSTRACT

An end cap includes a lid portion configured to close an end surface of an edge protector body, an insertion portion provided to the lid portion and configured to be inserted from the end surface of the edge protector body to the side of a bottom portion of a groove with respect to an inner lip portion, and a cantilevered beam-shaped rod portion provided on the lid portion, configured to be inserted from the end surface of the edge protector body between the inner lip portion and a notched groove (an engaged portion), and provided at a distal end side thereof with a projection (an engaging portion) engageable and disengageable with respect to the notched groove.

11 Claims, 10 Drawing Sheets

EDGE PROTECTOR

CROSS REFERENCE TO RELATED APPLICATION (none)

BACKGROUND OF THE INVENTION

The present invention relates to an edge protector including an edge protector body having an opened end surface, a groove formed along the longitudinal direction thereof for allowing insertion of an upper edge portion of a door outer panel, and having a substantially C-shape in cross section, and an end cap configured to be inserted from the end surface of the edge protector body and configured to close an opened surface of the edge protector body.

FIELD OF THE INVENTION (First Prior Art)

In the prior art, an adhesive agent or calking is used for attachment of an edge protector body having a substantially C-shape in cross section and including an end cap configured to close an opened end surface of the edge protector body.

Figure 6:
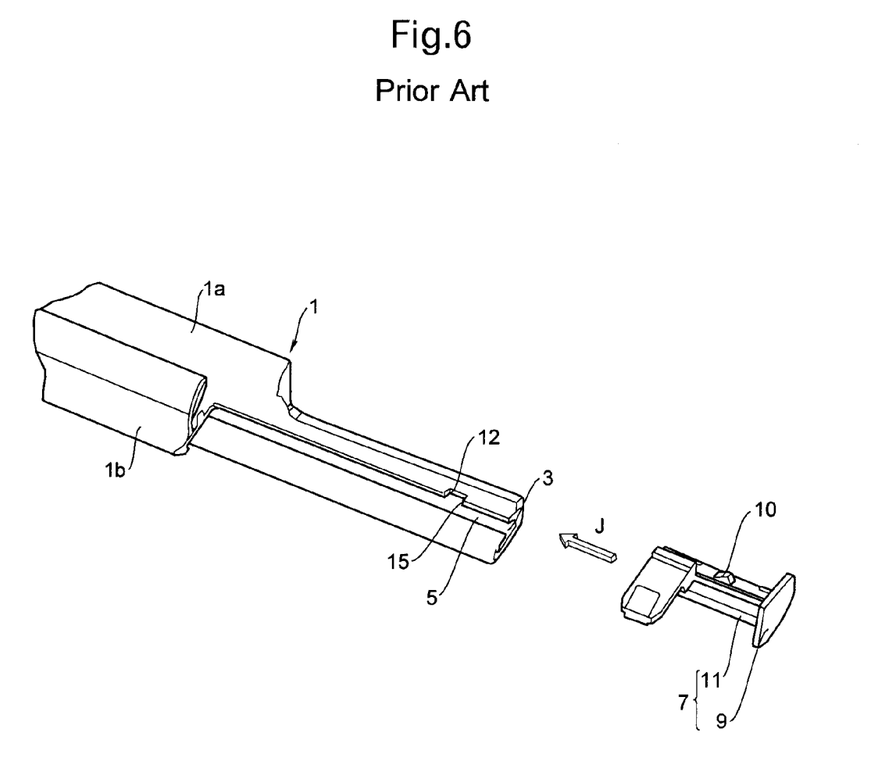
FIG. 6 is a perspective view for explaining a first prior art.

However, since squeezing out of the adhesive agent or disconnection of the end cap due to defective caulking may occur, a mounting structure as shown in FIG. 6 is proposed.

In FIG. 6, an edge protector body 1 has an opened end surface 3, is formed with a groove 5 along the longitudinal direction thereof, and has a substantially C-shape in cross section. Also, an outer surface of the edge protector body 1 is formed with a lip 1a and a lip 1b coming into abutment with a window glass to support the window glass and preventing entry of rainwater into an interior of a door panel.

An end cap 7 includes a lid portion 9 configured to close the opened end surface 3 and an insertion portion 11 provided on the lid portion 9 and inserted from the opened end surface 3 of the edge protector body 1.

At the end portion of the edge protector body 1, the lip 1a, the lip 1b, and a wall portion of the edge protector body 1 are partly cut off. The edge protector body 1 is formed with a hole 12, and the insertion portion 11 of the end cap 7 is formed with a projecting portion 10 which is capable of engaging the hole 12.

When the insertion portion 11 of the end cap 7 is inserted into the opened end surface 3 of the edge protector body 1, the projecting portion 10 of the end cap 7 engages the hole 12 of the edge protector body 1, and the end cap 7 configured to close the opened end surface 3 of the edge protector body 1 is attached to the end surface of the edge protector body 1 (see JP-A-2005-104168).

(Second Prior Art)

However, in the first prior art, since the lip 1a and the lip 1b at the end portion of the edge protector body 1 are cut off, support of the window glass becomes uneven, which causes a problem of entry of rainwater into the door panel.

Accordingly, a configuration in which the end cap which closes the opening surface on the end surface of the edge protector body is attached without cutting the lips off is proposed.

Figure 7:
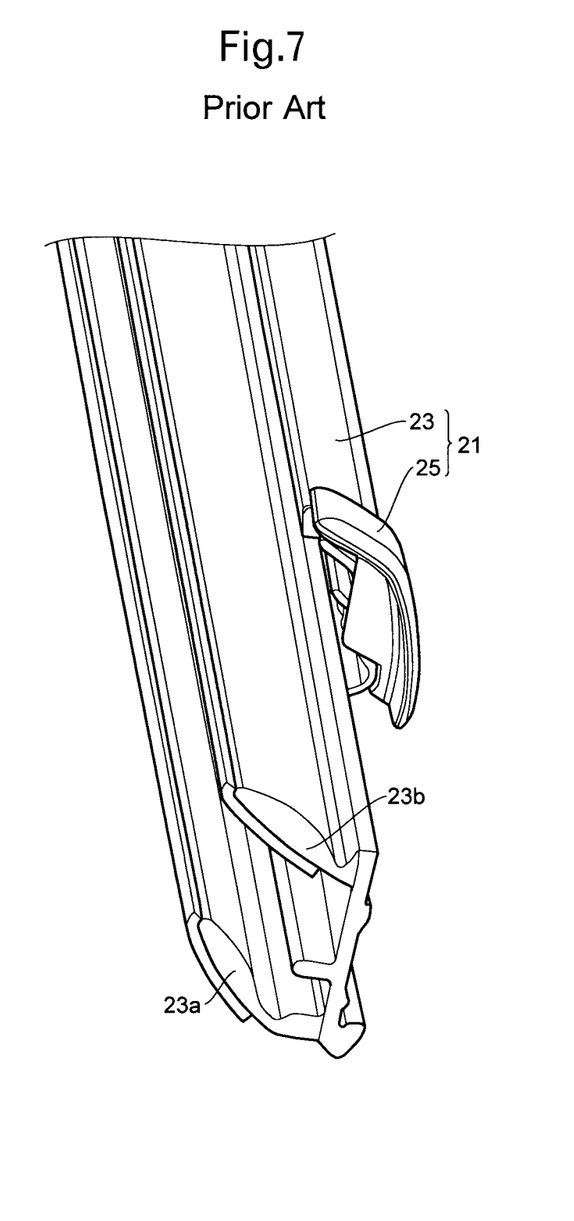
FIG. 7 is an explanatory drawing of a second prior art and is a perspective view of an edge protector having an end cap attached to an end surface of an edge protector body.
Figure 8:
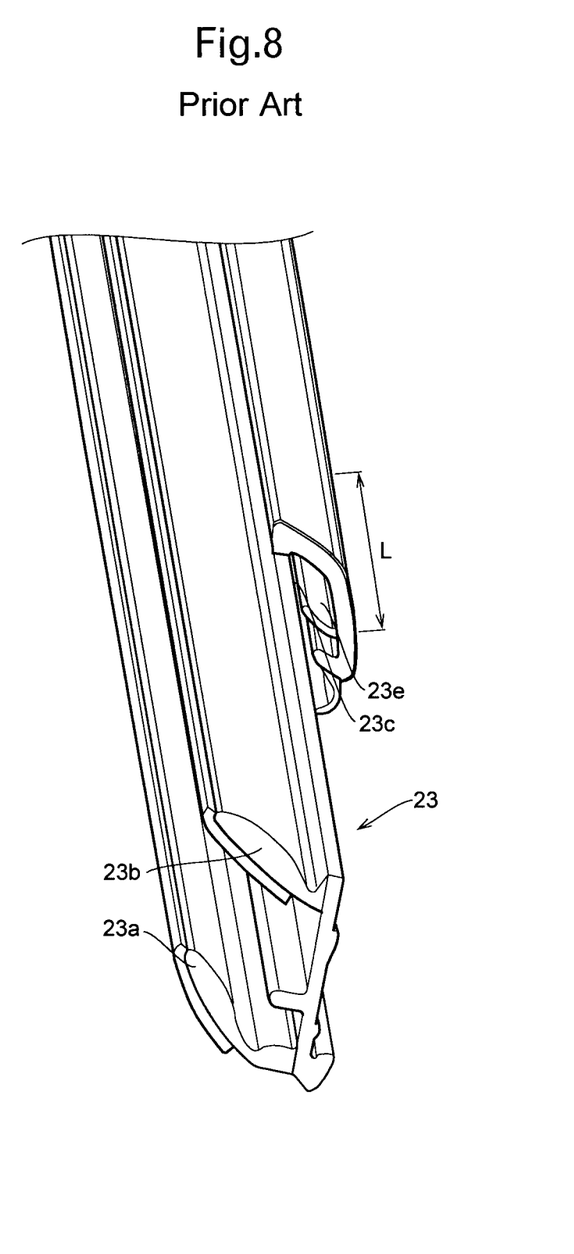
FIG. 8 is a perspective view showing a state in which the end cap is removed in FIG. 7.
Figure 9:
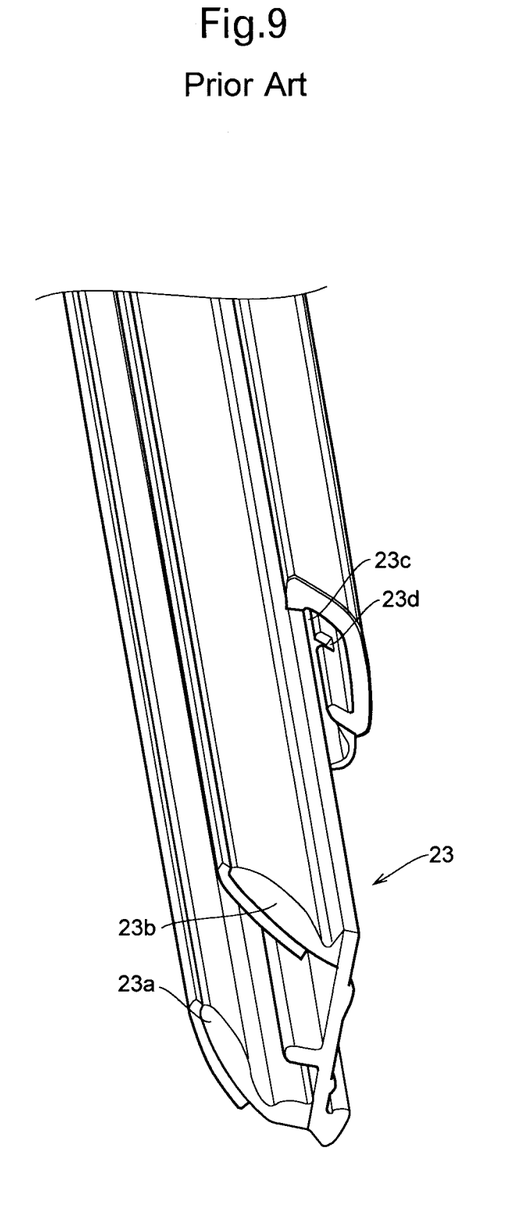
FIG. 9 is a perspective view in which an inner lip portion is removed in FIG. 8.
Figure 10:
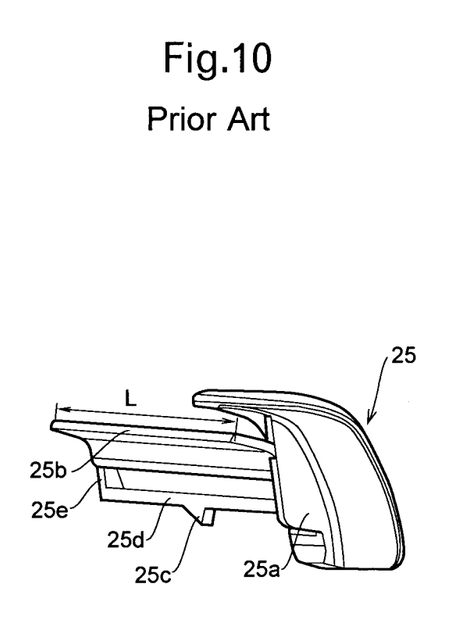
FIG. 10 is a perspective view of the end cap in FIG. 7.

Referring now to FIG. 7 to FIG. 10, description will be given below. FIG. 7 is a perspective view of an edge protector having the end cap attached to the end surface of the edge protector body, FIG. 8 is a perspective view showing a state in which the end cap is removed from FIG. 7, FIG. 9 is a perspective view showing a state in which an inner lip portion is removed from FIG. 8, and FIG. 10 is a perspective view of the end cap in FIG. 7.

In FIG. 7, an edge protector 21 includes an edge protector body 23 and an end cap 25.

As shown in FIG. 8 and FIG. 9, the edge protector body 23 is formed with a groove 23c which allows insertion of an upper end portion of a door outer panel along the longitudinal direction thereof, and is formed into a substantially C-shape in cross section. The edge protector body 23 is formed with a lip 23a and a lip 23b over the entire length thereof. A portion of the edge protector body 23 on the side of an end portion where the lips are not formed is cut off, and the end cap 25 is attached so as to close the end surface.

The edge protector body 23 is formed with a depression (an engaged portion) 23d which allows engagement and disengagement of an engaging projection of the end cap, described later, on a lower portion thereof. The edge protector body 23 is formed with an inner lip portion 23e which comes into abutment with the upper end portion of the door outer panel on an inner wall of the groove 23c thereof.

As shown in FIG. 10, the end cap 25 is provided with a lid portion 25a configured to cover an end surface of the edge protector body 23. The lid portion 25a is formed with an insertion portion 25b to be inserted from the end surface of the edge protector body 23 into the interior of the edge protector body 23 and a rod portion 25d formed with a projecting portion (an engaging portion) 25c which is capable of engaging the depression 23d of the edge protector body 23 at an intermediate portion thereof. Then, the distal end portion of the rod portion 25d is connected to a distal end portion of the supporting portion 25e, which is connected at one end portion thereof to the distal end portion of the insertion portion 25b and extends toward the rod portion 25d. Therefore, the rod portion 25d is provided in a state of a beam fixed at both end thereof, that is, fixed at one end portion thereof to the lid portion 25a of the end cap 25 and at the other end portion thereof to the supporting portion 25e.

When the insertion portion 25b of the end cap 25 is inserted into the end surface of the edge protector body 23, the projecting portion 25c of the rod portion 25d of the end cap 25 engages the depression 23d of the edge protector body 23, and the end cap 25 configured to close an opening surface of the edge protector body is attached to the end surface of the edge protector body 23.

Patent Document: JP-A-2005-104168

In the edge protector having a configuration as shown in FIG. 7 to FIG. 10, the supporting portion 25e of the end cap 25 and the inner lip portion 23e of the edge protector body 23 interfere with each other when the end cap 25 is inserted into the end surface of the edge protector body 23, so that the inner lip portion 23e is resiliently deformed to a position apart from the upper end portion of the door outer panel. The length of the resiliently deformed inner lip portion 23e is equivalent to a length L of the insertion portion 25b of the end cap 25 from the opening surface of the edge protector body 23 (see FIG. 8 and FIG. 10).

Therefore, there is a problem of lowering of retentivity of the inner lip portion 23e for holding the edge protector body 23 and the upper edge portion of the door outer panel.

Also, since the insertion causes a resilient deformation of the inner lip portion 23e, there is a problem of poor insertability of the end cap 25.

BRIEF SUMMARY OF THE INVENTION

In view of such problems, it is an object of the invention to provide an edge protector which does not cause lowering of retentivity with respect to a door outer panel, and ensures good insertability of an end cap.

According to a first aspect of the invention, there is provided an edge protector including: an edge protector body having an end surface formed into an opened end surface, a groove formed along the longitudinal direction thereof for allowing insertion of an upper edge portion of an door outer panel, and having a substantially C-shape in cross section on the side of an end portion; and an end cap configured to be inserted from the end surface of the edge protector body for closing the end surface of the edge protector body, wherein the edge protector body includes: an inner lip portion formed on an inner wall of the groove and coming into abutment with the upper edge portion of the outer panel; and an engaged portion formed on the inner wall of the groove and provided on the side of an opening of the groove with respect to the inner lip portion, the end cap includes: a lid portion configured to close the end surface, an insertion portion provided on the lid portion, and configured to be inserted from the end surface of the edge protector body on the side of a bottom portion of the groove with respect to the inner lip portion; and a cantilevered beam-shaped rod portion provided on the lid portion, configured to be inserted from the end surface of the edge protector body between the inner lip portion and the engaged portion, having an engaging surface intersecting the direction of insertion on the distal end side, and provided with an engaging portion engageable and disengageable with respect to the engaged portion.

According to a second aspect of the invention, there is provided the edge protector according to the first aspect of the invention, wherein an outer surface of the end cap extending along the direction of insertion of an insertion portion has a shape extending along an inner surface of the edge protector body, and the insertion portion of the end cap is longer than the rod portion.

According to a third aspect of the invention, there is provided the edge protector according to the first aspect of the invention, wherein the rod portion is resiliently deformed toward the inner lip portion when the engaging portion engages and disengages the engaged portion, and the distance between the rod portion and the inner lip portion is narrower than the amount of resilient deformation of the rod portion when the engaging portion is disengaged from the engaged portion.

According to the first to the third aspects of the invention, the edge protector body includes: the inner lip portion formed on the inner wall of the groove and coming into abutment with the upper edge portion of the outer panel; and the engaged portion formed on the inner wall of the groove and provided on the side of the opening of the groove with respect to the inner lip portion, the end cap includes: the lid portion configured to close the end surface, the insertion portion provided on the lid portion, and configured to be inserted from the end surface of the edge protector body toward the bottom portion of the groove with respect to the inner lip portion; a cantilevered beam-shaped rod portion provided on the lid portion, inserted from the end surface of the edge protector body between the inner lip portion and the engaged portion, having an engaging surface intersecting the direction of insertion on the distal end side, and provided with the engaging portion engageable and disengageable with respect to the engaged portion. Therefore, the inner lip portion of the edge protector body and the end cap do not interfere with each other when the end cap is inserted into the edge protector body.

Therefore, a retentivity of the inner lip portion for holding the edge protector body and the upper edge portion of the outer panel is not lowered. Also, good insertability of the end cap is ensured.

According to the second aspect of the invention, the outer surface of the end cap extending along the direction of insertion of the insertion portion follows the shape of the inner surface of the edge protector body, and the insertion portion of the end cap is longer than the rod portion, whereby the insertion portion of the end cap is firstly inserted into the edge protector body, and the circumferential positioning of the end cap about the direction of insertion as an axis is achieved. Therefore, good insertability is ensured.

According to the third aspect of the invention, the rod portion is resiliently deformed toward the inner lip portion when the engaging portion engages and disengages the engaged portion, and the distance between the rod portion and the inner lip portion is narrower than the amount of resilient deformation of the rod portion when the engaging portion is disengaged from the engaging portion. Therefore, a force to pull out the end cap from the edge protector body acts to resiliently deform the rod portion of the end cap, and the rod portion comes into abutment with the inner lip portion of the edge protector body before the engaging portion leaves the engaging portion of the edge protector body, which prevents the end cap from coming apart.

DETAILED DESCRIPTION OF THE INVENTION

Figure 4:
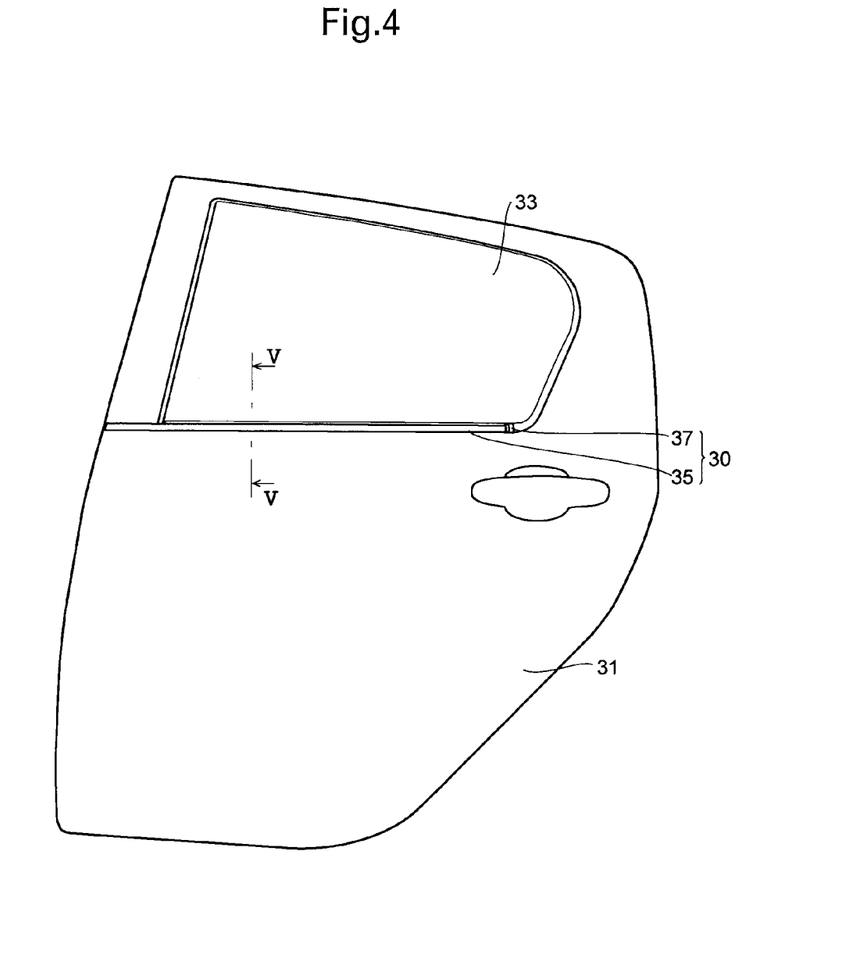
FIG. 4 is a drawing showing a door of a vehicle attached with the edge protector according to the embodiment.

Referring first to FIG. 4, which is a drawing showing a door of a vehicle attached with an edge protector according to an embodiment, the edge protector will be described. An edge protector 30 in this embodiment is provided at an upper end of an outer panel 31, comes into abutment with a window glass 33 moving upward and downward, and has a function of a weather strip which prevents entry of rainwater or the like into the door.

The edge protector 30 includes an edge protector body 35 having an opening surface on an end surface thereof, and an end cap 37 configured to close the end surface of the edge protector body 35.

The edge protector body 35 is a member having lips or the like formed by injection molding a soft resin on an outer surface and an inner surface of a base body formed of a hard resin.

Figure 5:
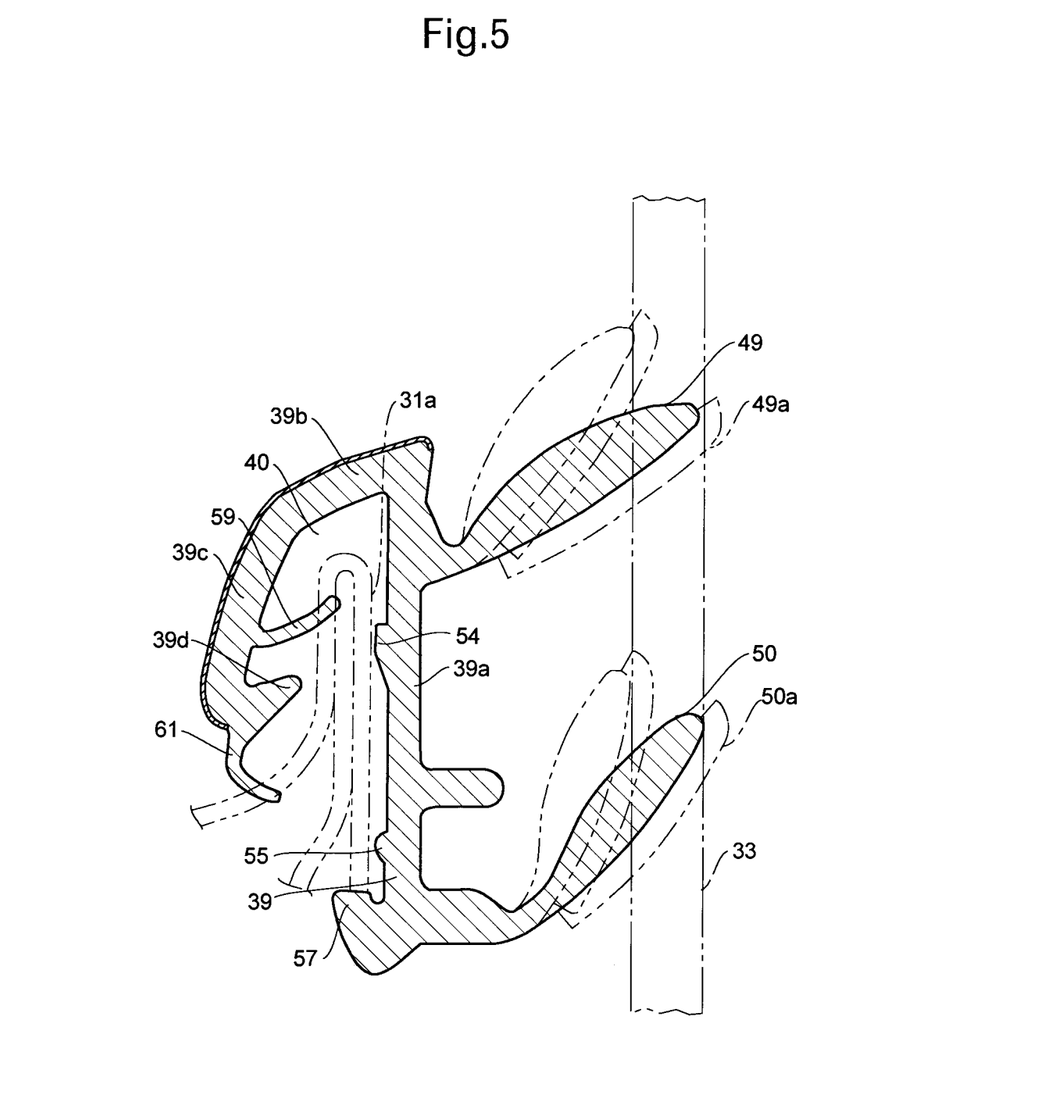
FIG. 5 is a cross-sectional view taken along the line V-V in FIG. 4.

Referring now to FIG. 5, which is a cross-sectional view taken along the line V-V in FIG. 4, the edge protector body 35 will be described.

A base body 39 of the edge protector body 35 has a substantially C-shape in cross section, and is configured to hold an upper edge portion 31a of the outer panel 31 folded back from both sides. The base body 39 includes an inner side portion 39a opposing an inner surface of the upper edge portion 31a, an upper portion 39b bent from an upper end portion of the inner side portion 39a toward the outside of the vehicle and opposing an upper surface of the upper edge portion 31a, an outer side portion 39c opposing an outer surface of the upper edge portion 31a and connected to the upper portion 39b, and a bent portion 39d bent from a lower portion of the outer side portion 39c toward the upper edge portion 31a. Then, a groove 40 is formed between the inner side portion 39a and the outer side portion 39c extending along the longitudinal direction of the edge protector body 35.

The base body 39 is formed on an outer surface of the inner side portion 39a thereof with lips 49 and 50 formed of a soft resin coming into abutment with an outer surface of the window glass 33 which moves upward and downward. Portions of the lips 49 and 50 coming into abutment with the window glass 33 are formed with bristle-set portions 49a and 50a.

Formed on an inner surface (an inner wall of the groove 40) of the inner side portion 39a of the base body 39 so as to extend along the longitudinal direction thereof are horizontally positioning projecting portions 54 and 55 which are capable of coming into abutment with an inner side surface of the upper edge portion 31a. Formed on a lower portion of the inner side portion 39a of the base body 39 is a vertically positioning projecting portion 57 which is capable of coming into abutment with a lower surface of the upper edge portion 31a.

Formed on an inner surface (the inner wall of the groove 40) of the outer side portion 39c of the base body 39 so as to extend along the longitudinal direction thereof is an inner lip portion 59 formed of a soft resin and coming into abutment with an outer side surface of the upper edge portion 31a. By the inner lip portion 59 coming into abutment with the outer side surface of the upper edge portion 31a, the horizontally positioning projecting portion 54 and the horizontally positioning projecting portion 55 of the edge protector body 35 come into abutment with the upper edge portion 31a, so that the edge protector body 35 is positioned in the horizontal direction which is orthogonal to the longitudinal direction thereof.

Formed on the lower portion of the outer side portion 39c of the base body 39 so as to extend along the longitudinal direction thereof is a lower lip portion 61 formed of a soft resin and coming into abutment with an outer surface of the outer panel 31. By the lower lip portion 61 coming into abutment with the outer surface of the outer panel 31, the vertically positioning projecting portion 57 of the edge protector body 35 comes into abutment with the lower surface of the upper edge portion 31a, so that the edge protector body 35 is positioned in the vertical direction thereof.

Figure 1:
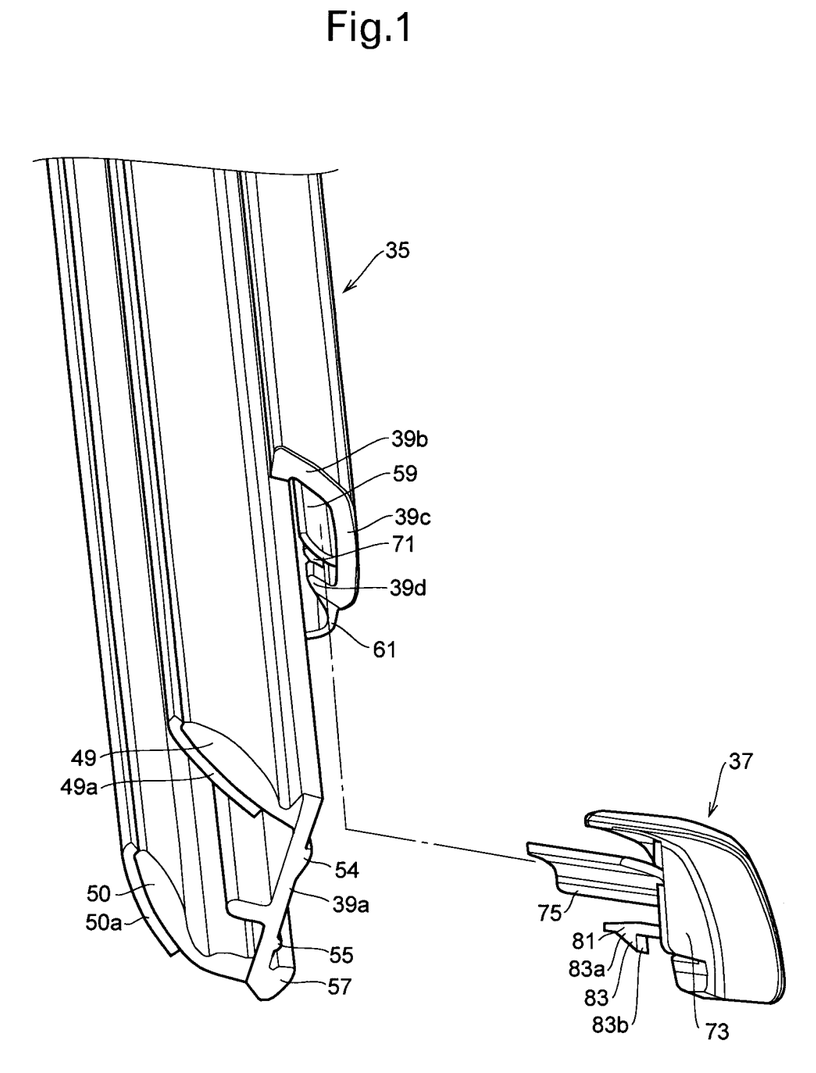
FIG. 1 is a perspective view of an edge protector body and an end cap according to an embodiment.
Figure 2:
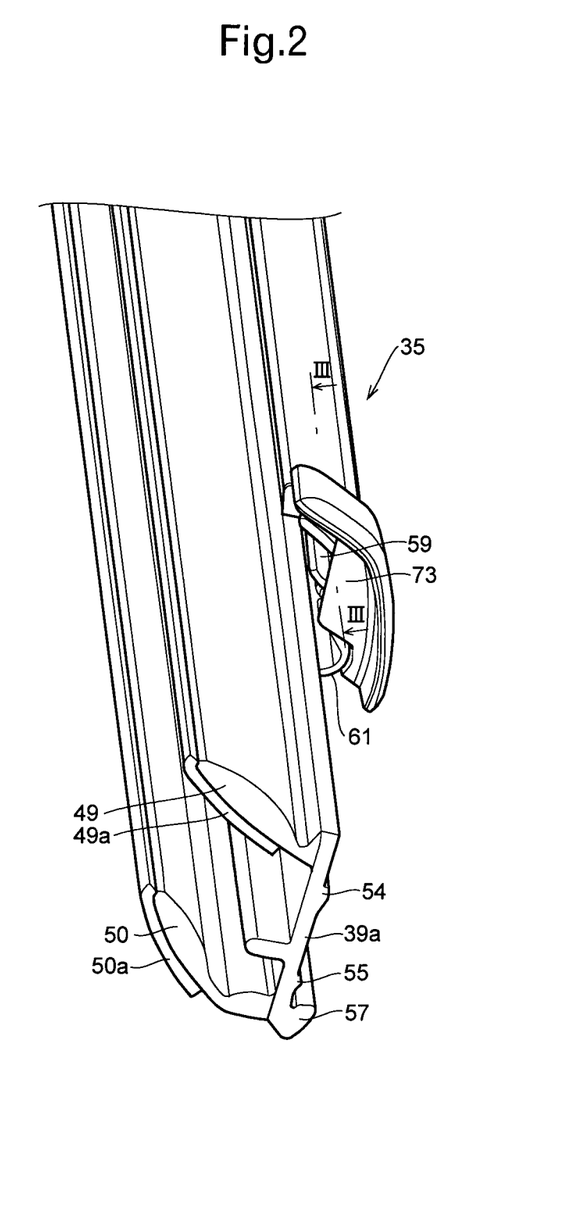
FIG. 2 is a perspective view of an edge protector having the end cap attached to the edge protector body in FIG. 1.
Figure 3:
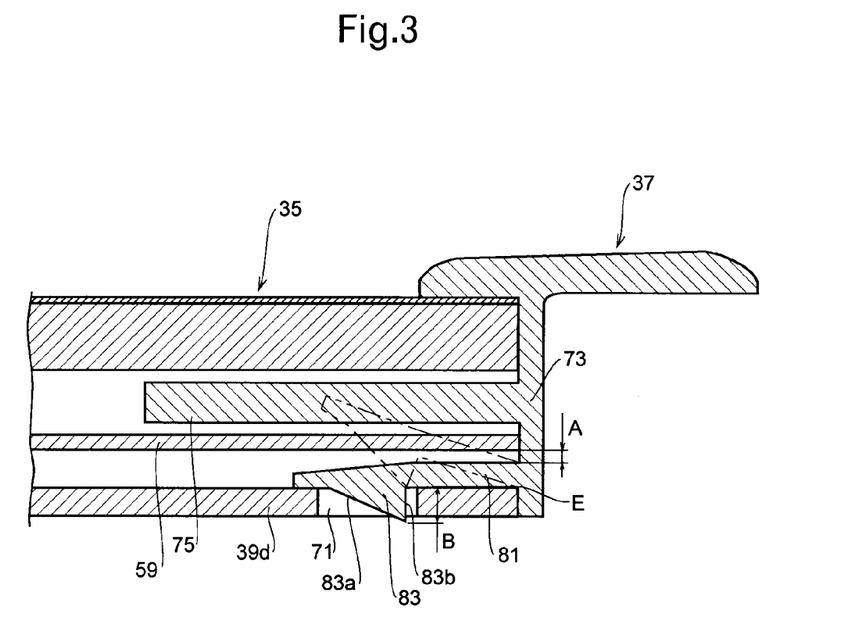
FIG. 3 is a cross-sectional view taken along the line III-III in FIG. 2.

Referring now to FIG. 1 to FIG. 3, a mounting structure of the edge protector body 35 and the end cap 37 will be described. FIG. 1 is a perspective view of the edge protector body and the end cap, FIG. 2 is a perspective view of the edge protector having the end cap attached to the edge protector body in FIG. 1, and FIG. 3 is a cross-sectional view taken along the line III-III in FIG. 2.

On the side of an end portion of the edge protector body 35, the upper portion 39b, the outer side portion 39c, and the bent portion 39d of the base body 39 are cut off. The bent portion 39d in the vicinity of the end surface of the edge protector body 35 is formed with a notched groove 71 as an engaged portion.

The end cap 37 configured to close the end surface of the edge protector body 35 is inserted from the end surface of the edge protector body 35.

The end cap 37 includes a lid portion 73 configured to close the end surface of the edge protector body 35. The lid portion 73 is formed with an insertion portion 75 to be inserted from the end surface of the edge protector body 35 toward the upper portion 39b side (the bottom portion side of the groove 40) with respect to the inner lip portion 59. An outer surface of the insertion portion 75 extending along the direction of insertion is set into a shape extending from the upper portion 39b of the edge protector body 35 along the inner surface of the outer side portion 39c. Furthermore, the lid portion 73 is formed with a cantilevered beam-shaped rod portion 81 inserted from the end surface of the edge protector body 35 between the inner lip portion 59 and the bent portion 39d formed with the notched groove (the engaged portion) 71. Formed on the distal end side of the rod portion 81 is a projecting portion 83 (engaging portion) which is engageable and disengageable with respect to the notched groove 71. A front portion of the projecting portion 83 is an inclined surface 83a coming into abutment with a corner E between the end surface and an inner surface of the edge protector body 35 (see FIG. 3) when being inserted from the end surface of the edge protector body 35, and generating a component force which causes the rod portion 81 to be resiliently deformed toward the inner lip portion 59. A rear portion of the projecting portion 83 is a vertical surface 83b substantially parallel to a wall surface of the opposed notched groove 71 in a state in which the projecting portion 83 engages the notched groove 71. The vertical surface 83b intersects the direction of insertion and, when the inserted end cap 37 is moved so as to pull out from the edge protector body 35, the vertical surface 83b of the projecting portion 83 comes into abutment with the wall surface of the notched groove 71, and serves as an engaging surface which prohibits the end cap 37 from being pulled out.

Also, in this embodiment, the insertion portion 75 of the end cap 37 is set to be longer than the rod portion 81. Also, as shown in FIG. 3, a distance (A) between the rod portion 81 and the inner lip portion 59 is set to be smaller than the amount of resilient deformation (B) of the rod portion 81 when the projecting portion 83 is disengaged from the notched groove 71.

In this configuration, the following effects are achieved.

(1) The end cap 37 includes the lid portion 73 configured to close the end surface of the edge protector body 35, the insertion portion 75 provided on the lid portion 73 and configured to be inserted from the end surface of the edge protector body 35 on the side of the bottom portion of the groove with respect to the inner lip portion 59, and the cantilevered beam-shaped rod portion 81 provided on the lid portion 73 and configured to be inserted from the end surface of the edge protector body 35 between the inner lip portion 59 and the bent portion 39d formed with the notched groove (the engaged portion) 71, whereby the inner lip portion 59 of the edge protector body 35 and the end cap 37 do not interfere with each other when the end cap 37 is inserted into the edge protector body 35.

Therefore, retentivity of the inner lip portion 59 for holding the edge protector body 35 and the upper edge portion 31a of the outer panel 31 of the door is not lowered. Also, good insertability of the end cap 37 is ensured.

(2) The outer surface of the end cap 37 extending along the direction of insertion of the insertion portion 75 is set so as to follow the shape of the inner surface of the outer side portion 39c from the upper portion 39b of the edge protector body 35, and the insertion portion 75 of the end cap 37 is longer than the rod portion 81. Therefore, the insertion portion 75 of the end cap 37 is firstly inserted into the edge protector body 35, and the circumferential positioning of the end cap 37 about the direction of insertion as an axis is achieved. Therefore, good insertability is ensured.

(3) The distance between the rod portion 81 and the inner lip portion 59 is set to be narrower than the amount of resilient deformation of the rod portion 81 when the projecting portion 83 is disengaged from the notched groove 71. Therefore, a force to pull out the end cap 37 from the edge protector body 35 acts to resiliently deform the rod portion 81 of the end cap 37, and the rod portion 81 comes into abutment with the inner lip portion 59 of the edge protector body 35 before the projecting portion (the engaging portion) 83 is disengaged from the notched groove (the engaged portion) 71 of the edge protector body 35, which prevents the end cap 37 from coming apart.

IN THE DRAWINGS

35: an edge protector body
37: an end cap
59: an inner lip portion
71: a notched groove (an engaged portion)
73: a lid portion
81: a rod portion
83: a projecting portion (an engaging portion)

The invention claimed is:

1. An edge protector comprising:
an edge protector body having a substantially C-shape in cross section; and
an end cap that closes an end surface of the edge protector body, wherein
the edge protector body includes
an end surface formed into an opened end surface,
a groove formed along the longitudinal direction thereof,
an inner lip portion formed on an inner wall of the groove and
an engaged portion formed on the inner wall of the groove and provided on the side of an opening of the groove with respect to the inner lip portion and
the end cap includes
a lid portion that closes the end surface,
an insertion portion provided on the lid portion, and inserted from the end surface of the edge protector body on the side of a bottom portion of the groove with respect to the inner lip portion; and
a cantilevered beam-shaped rod portion provided on the lid portion, inserted from the end surface of the edge protector body between the inner lip portion and the engaged portion, having an engaging surface intersecting the direction of insertion on the distal end side, and provided with an engaging portion engageable and disengageable with respect to the engaged portion, wherein
the inner lip portion entirely covers the engaged portion along the longitudinal direction of the edge protector.

2. The edge protector according to claim 1, wherein an outer surface of the end cap extending along the direction of insertion of an insertion portion has a shape extending along an inner surface of the edge protector body, and
the insertion portion of the end cap is longer than the rod portion.

3. The edge protector according to claim 1, wherein the rod portion is resiliently deformed toward the inner lip portion when the engaging portion engages and disengages the engaged portion, and the distance between the rod portion and the inner lip portion is narrower than the amount of resilient deformation of the rod portion when the engaging portion is disengaged from the engaged portion.

4. The edge protector according to claim 1, wherein
the engaged portion is a notched groove, and
the inner lip portion extends across the side walls of the notched groove.

5. The edge protector according to claim 1, wherein the rod portion is in the form of a rod inserted in the longitudinal direction of the edge protector body.

6. The edge protector according to claim 1, wherein
an outer surface of the edge protector body has a lip that extends along an edge of the edge protector body in the longitudinal direction of the edge protector body.

7. The edge protector according to claim 1, wherein the inner lip portion extends to the end surface of the edge protector body.

8. The edge protector according to claim 1, wherein the engaging portion has an inclined surface on the side of the opening of the groove.

9. The edge protector according to claim 1, wherein the insertion portion and the rod portion are inserted from the end surface of the edge protector into the edge protector body to sandwich the inner lip portion between the insertion portion and the rod portion.

10. The edge protector according to claim 1, wherein an extended portion of the rod portion and an extended portion of the lid portion are inserted from the end surface of the edge protector into the edge protector body to sandwich an external side portion of the edge protector body between the extended portions.

11. The edge protector according to claim 1, wherein the inner lip portion entirely covers the engaged portion in a manner where the inner lip portion is apart from the engaged portion.

* * * * *